United States Patent
Montboeuf et al.

(10) Patent No.: US 8,840,316 B2
(45) Date of Patent: Sep. 23, 2014

(54) SUSPENSION THRUST BEARING DEVICE

(75) Inventors: Bruno Montboeuf, Cerelles (FR);
Désiré Vidot, Joue-les-Tours (FR);
Florence Crenn, Amboise (FR);
Richard Corbett, Fondettes (FR)

(73) Assignee: Aktiebolaget SKF, Gothenburg (SE)

( * ) Notice: Subject to any disclaimer, the term of this patent is extended or adjusted under 35 U.S.C. 154(b) by 25 days.

(21) Appl. No.: 13/279,637

(22) Filed: Oct. 24, 2011

(65) Prior Publication Data

US 2012/0189237 A1    Jul. 26, 2012

(51) Int. Cl.
*F16C 33/76*    (2006.01)
*F16C 33/58*    (2006.01)

(52) U.S. Cl.
USPC .......................................... 384/607; 384/615

(58) Field of Classification Search
CPC ............... F16C 2316/05; F16C 33/761; B60G 2204/418; B60G 2204/128
USPC ......... 384/607, 609, 611, 615, 484, 485, 486; 277/347, 409, 411, 412; 267/220; 280/124.155, 124.154
See application file for complete search history.

(56) References Cited

U.S. PATENT DOCUMENTS

| | | | | |
|---|---|---|---|---|
| 3,268,279 A | * | 8/1966 | Greby | 384/607 |
| 3,550,974 A | * | 12/1970 | Kupchick | 384/480 |
| 4,948,272 A | * | 8/1990 | Stowe | 384/607 |
| 5,618,116 A | * | 4/1997 | Ishikawa | 384/607 |
| 6,267,512 B1 | * | 7/2001 | Beghini et al. | 384/609 |
| 6,485,185 B1 | * | 11/2002 | Conway et al. | 384/484 |
| 6,814,496 B2 | * | 11/2004 | Beghini et al. | 384/617 |
| 7,114,853 B2 | * | 10/2006 | Debrailly et al. | 384/612 |
| 2002/0009250 A1 | * | 1/2002 | Schwarzbich | 384/607 |

FOREIGN PATENT DOCUMENTS

| | | |
|---|---|---|
| DE | 102007024628 A1 * | 12/2007 |
| EP | 1170157 A1 | 1/2002 |
| FR | 2901737 A1 | 12/2007 |
| FR | 2928187 A1 | 9/2009 |
| WO | WO 2009145216 A1 * | 12/2009 |

OTHER PUBLICATIONS

WO 2009/145216 A1—Machine Translation.*

* cited by examiner

*Primary Examiner* — Thomas R Hannon
(74) *Attorney, Agent, or Firm* — Bryan Peckjian; SKF USA Inc. Patent Department

(57) ABSTRACT

A suspension thrust bearing device having a lower cover, an upper cover and a rolling bearing disposed between the lower cover and the upper cover. The rolling bearing providing a lower ring mounted on the lower cover and an upper ring mounted on the upper cover. The rolling bearing further providing rolling elements disposed between the two rings. The lower cover has a body formed of a rigid material part and a flexible material part forming a seal of the device. The flexible part of the lower cover includes at least one labyrinth sealing lip that cooperates with the upper cover to leave a narrow passage forming a labyrinth seal between one edge of the labyrinth sealing lip and the upper cover and at least one rubbing sealing lip in contact with the upper cover.

14 Claims, 2 Drawing Sheets

SUSPENSION THRUST BEARING DEVICE

CROSS-REFERENCE

This application claims the benefit of prior co-pending French Utility Model Application No. FR 1057502, filed Sep. 20, 2010.

FIELD OF THE INVENTION

The present invention relates to the field of suspension thrust bearing devices used, in particular, on motor vehicles in the suspension struts of steered wheels.

BACKGROUND OF THE INVENTION

A suspension thrust bearing conventionally comprises a rolling bearing forming an axial thrust bearing and comprising an upper ring and a lower ring between which is disposed a row of rolling elements, for example balls or rollers. An oblique contact bearing is preferably used to withstand both radial and axial forces exerted on the suspension thrust bearing device. The upper and lower rings are usually mounted in contact with upper or lower cover supporting or bearing parts such as cups or covers. The upper and lower covers form a housing for the bearing rings and provide an interface between said rings and the neighbouring elements.

Such a suspension thrust bearing device is disposed on the upper portion of the suspension strut between a suspension spring and a upper member fastened to the chassis of the vehicle. The suspension spring is fitted around a damper piston rod, the end of which may be fastened to the chassis of the vehicle via an elastic block for filtering vibrations. The suspension spring, which is generally a coil spring, axially bears, directly or indirectly, on the lower bearing cover of the suspension thrust bearing device. The upper cover is fixed to the chassis of the vehicle.

The suspension thrust bearing thus enables transmission of axial forces between the suspension spring and the chassis of the vehicle while allowing a relative angular movement between the lower cover, which is mobile in rotation, and the elastic filter block. This angular movement occurs when the steered wheels of the vehicle are turned and/or when the suspension spring is compressed.

The inside of the rolling bearing, i.e. the space between the two rings, contains a lubricant. For the correct operation of the rolling bearing, it is necessary to retain the lubricant inside the rolling bearing and at the same time to prevent the penetration of solid or liquid pollutants into the inside of the rolling bearing. To this end, seals may be disposed at the junction between the two rings or shaped in such a manner as to form a labyrinth seal.

Referenced can be made to the French patent application 2 901 737 (SKF), which describes a suspension thrust bearing device including a lower supporting cover and a bearing mounted so as to bear on it. The lower supporting cover is made from a synthetic material and is associated with an element for filtering vibrations provided with a stiffener armature. This results in a good distribution of the load applied by the suspension spring and vibrations are significantly reduced. In operation, a suspension thrust bearing device of this kind is exposed to water splashes. To this end the upper and lower supporting covers are conformed to produce a contactless seal by means of a labyrinth seal both on the inner side and on the outer side, which is more exposed to water splashes. The above earlier patent application also provides attachment means between the upper cover and the lower cover to prevent separation of the two covers before mounting the suspension thrust bearing.

French patent application 2 928 187 (SKF) describes another embodiment of a suspension thrust bearing in which the lower cover has a body formed of a rigid synthetic material to transmit axial forces between the spring and the bearing and a flexible synthetic material that has sealing lips that may come into contact with axial cylindrical skirts forming part of the upper cover. In the above document, axial retention of the upper cover relative to the lower cover is achieved by cooperation between two hooks provided on the upper cover and a flexible sealing lip, which thus has two different technical functions. Having two functions may lead to drawbacks. To provide a suitable seal, the sealing lip must be as flexible as possible. This flexibility may compromise good axial retention of the upper cover relative to the lower cover.

The aim of the invention is to overcome the drawbacks of the prior art.

SUMMARY OF THE INVENTION

The present invention provides a suspension thrust bearing device in which the seal is perfect and the upper and lower covers are fastened together in an efficacious and simple manner without affecting the sealing function.

The present invention provides a suspension thrust bearing device comprising a lower cover, an upper cover and a rolling bearing disposed between the lower cover and the upper cover, said rolling bearing comprising a lower ring mounted on the lower cover and a upper ring mounted on the upper cover, and rolling elements disposed between the two rings, the lower cover having a body formed of a rigid material part and a flexible material part forming a seal of said device. Attachment means are provided on each of the lower cover and the upper cover to prevent axial separation of said covers.

The flexible part of the body of said lower cover includes at least one labyrinth sealing lip cooperating with the upper cover to leave a narrow passage forming a labyrinth seal between one edge of said labyrinth sealing lip and the upper cover and at least one rubbing sealing lip in contact with the upper cover, the sealing lips being separate from the attachment means.

The sealing lips being in a flexible material, the upper cover may therefore come into contact with one of the sealing lips without increasing the friction torque that is generated. Moreover, the attachment means being separate from the sealing lips, the attachment function may be efficaciously achieved without it being necessary to modify the material or the thickness of the sealing lips.

The sealing lips are preferably disposed on the same side relative to the bearing.

In one embodiment the rubbing sealing lip is disposed between the rolling elements and the labyrinth sealing lip.

If the labyrinth sealing lip is disposed between the rolling elements and the labyrinth sealing lip the rubbing sealing lip is in contact with a radial surface portion of the upper cover.

In another embodiment the labyrinth sealing lip is disposed between the rolling elements and the rubbing sealing lip.

If the labyrinth sealing lip is disposed between the rolling elements and the rubbing sealing lip the rubbing sealing lip is in contact with a cylindrical surface portion of the upper cover.

The sealing lips are advantageously inclined relative to each other, forming with the axis of the bearing an obtuse angle $\beta$ and an acute angle $\alpha$, respectively. The inclination of the sealing lips enables further reduction of the friction torque generated in the event of contact between one of the sealing lips and the upper cover.

The lower cover may comprise a radial annular flange extending radially outward beyond the upper cover, the annular flange then forming a deflector for any water splashes.

The upper cover preferably comprises an inner annular skirt and an outer annular skirt, one annular skirt comprising a hook extending radially toward the lower cover and able to cooperate with a corresponding hook on the lower cover.

Thus the upper and lower covers are retained before mounting the device in the suspension of the vehicle, independently of the seal provided by the two flexible material sealing lips.

The hooks may be disposed on the opposite side of the rolling elements to the sealing lips.

Advantageously, the hooks are formed from a rigid material.

For example, the hooks are disposed on the inside of the rolling elements and the sealing lips are disposed on the outside of the rolling elements.

The rigid material part and the flexible material part of said body are advantageously of synthetic materials of different kinds moulded one onto the other.

Another aspect of the invention provides a strut comprising a damper and a suspension thrust bearing device as described above.

BRIEF DESCRIPTION OF THE DRAWINGS

Other objects, features and advantages of the invention will become apparent on reading the following description given by way of nonlimiting example only and with reference to the appended drawings, in which.

DETAILED DESCRIPTION OF THE PREFERRED EMBODIMENTS

Figure 1:
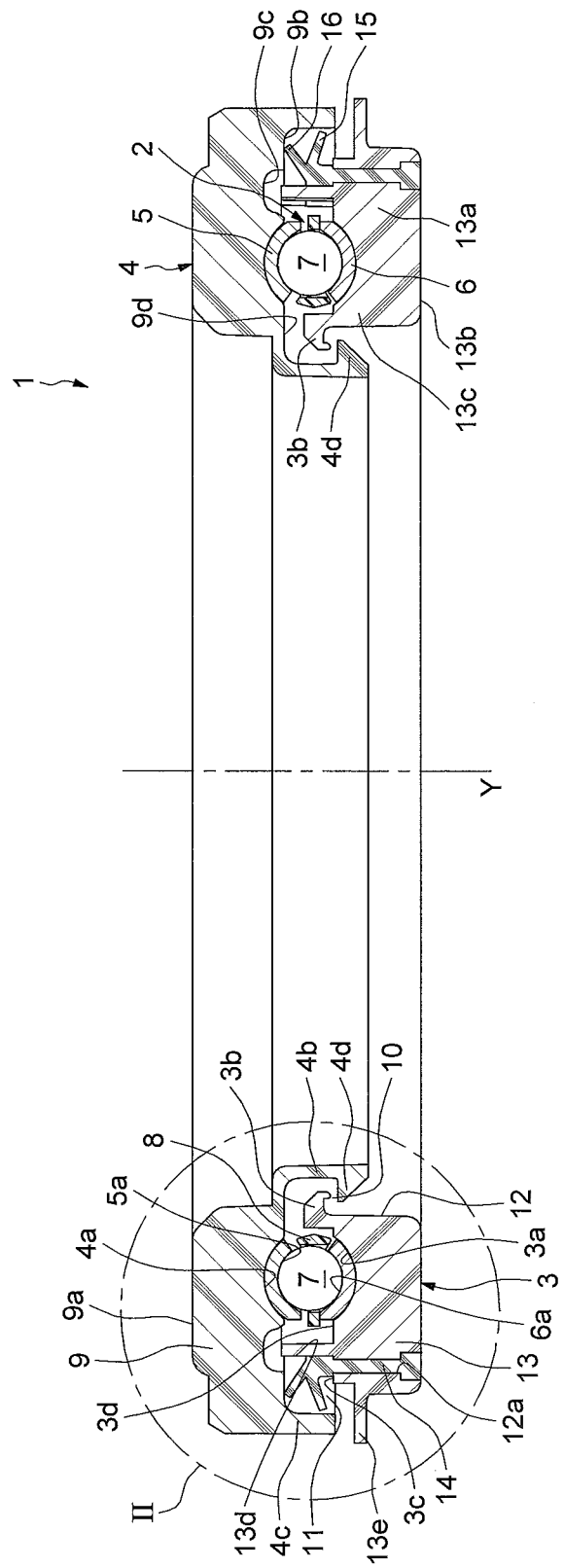
FIG. 1 is a view in axial section of a suspension thrust bearing device of a first embodiment of the invention.
Figure 2:
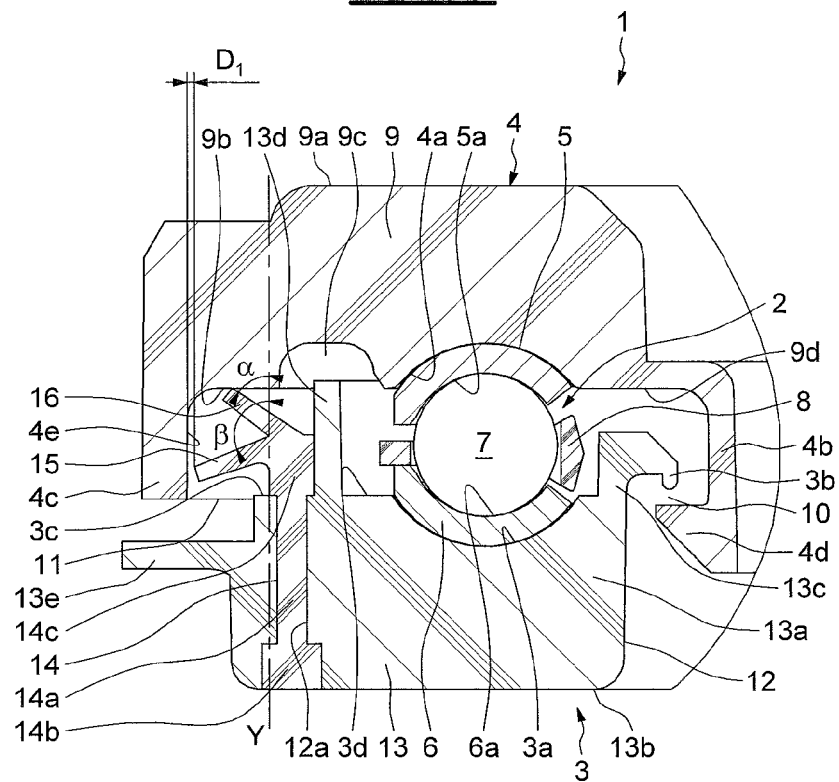
FIG. 2 is an enlarged view of part of FIG. 1.

As shown in FIGS. 1 and 2, the suspension thrust bearing device 1 comprises a rolling bearing 2 forming an axial thrust bearing. The rolling bearing 2 is supported by a lower cover 3 that further constitutes bearing means for a suspension coil spring that is not shown in the figures. The rolling bearing 2 is gripped between the lower cover 3 and a upper cover 4. The suspension thrust bearing device 1 is intended to be integrated into a suspension strut of an automobile vehicle (not shown) comprising the suspension spring, the upper turn of which bears on the lower cover 3, and a suspension damper comprising a damper rod (not shown) the axis Y of which is assumed vertical. The suspension spring is mounted around said damper rod.

The suspension thrust bearing device 1 is connected via the upper cover 4 to the chassis of the vehicle, which is not shown in the figures.

The rolling bearing 2, with axis Y, is a ball bearing in the example shown and comprises a upper ring 5 mounted in the upper cover 4 and a lower ring 6 mounted in the lower cover 3, between which is accommodated a row of rolling elements 7, constituted in the example shown by balls. The rolling elements 7 are disposed between raceways 5a, 6a formed by the upper ring 5 and the lower ring 6, which may be produced from the same sheet metal blank by cutting and stamping thanks to the fact that the outer diameter of the upper ring 5 is substantially equal to the inner diameter of the lower ring 6. A cage 8 is provided to maintain a regular circumferential spacing between the rolling elements 7.

The lower ring 6, of toroidal general shape, has in cross section a concave inner profile and is intended to form a toroidal raceway 6a for the rolling elements 7. The lower ring 6 is in contact with a complementary outer surface 3a of the lower cover 3. The upper ring 5, also of toroidal general shape, has a concave inner surface 5a forming a raceway for the rolling elements 7 and the outer surface of which comes into contact with a complementary inner surface 4a of the upper cover 4.

The upper cover 4, with axis Y, seen in more detail in FIG. 2, has the general shape of an annular flange and may consist in a one-piece part produced in synthetic material such as PA 6.6 polyamide, for example, optionally reinforced with glass fibres. The upper cover 4 comprises a solid part 9 the upper radial surface 9a of which is, in the example shown, oriented orthogonally relative to the axis Y of the suspension thrust bearing device 1 and is intended to come into contact with an element of the chassis of the vehicle (not shown). In the example shown, the upper cover 4 includes an axial inner annular skirt 4b and an axial outer annular skirt 4c. The rolling bearing 2 is entirely accommodated between the two axial skirts 4b, 4c. The inner axial skirt 4b is thinner than the rest of the upper cover 4 and has at its end facing toward the lower cover 3 a plurality of hooks 4d directed radially toward the lower cover 3 and distributed around its circumference. The hooks 4d are adapted to cooperate with complementary hooks 3b on the lower cover 3. The hooks 4d shown form radial protuberances directed outward, but may instead be replaced by a continuous circumferential rib at the lower end of the inner axial skirt 4b. In operation, a free space 10 is preserved between the respective hooks 4d, 3b, thus forming a labyrinth seal. On the outside, the outer axial skirt 4c leaves a space 11 between itself and an annular rim 3c of the lower cover 3. The outer axial skirt 4c is extended radially by a radial surface portion 9b connected by an annular recess 9c to the toroidal surface 4a, its shape conforming to the shape of the upper ring 5 of the rolling bearing 2. The toroidal surface 4a is then connected to the inner axial skirt 4b by a radial surface portion 9d.

The lower cover 3, with axis Y, shown in detail in FIG. 2, has a body 12 formed of a rigid material part 13 and a flexible material part 14. The rigid part 13 of the body 12 may be produced in a rigid synthetic material such as PA 6.6 polyamide, for example, optionally reinforced with glass fibres. In the present description, by "rigid" material is meant a material of greater rigidity than the so-called "flexible" material. The lower cover 3, which is in the form of an annular flange, comprises a solid part 13a the lower radial surface 13b of which is, in the example shown, oriented orthogonally relative to the axis Y of the suspension thrust bearing device 1 and forms a bearing surface for the suspension spring. In the example shown, the lower cover 3 has an inner annular skirt 13c directed toward the upper cover 4 and comprising a hook 3b extending radially inward and adapted to cooperate with the hook 4d on the upper cover 4 in order to prevent the covers 3 and 4 separating before mounting the device in the vehicle. The inner axial skirt 13c is extended radially by a toroidal surface 3a the shape of which conforms to the shape of the lower ring 6 of the rolling bearing 2, then a radial surface portion 3d, and finally an annular axial finger 13d extending axially toward the upper cover 4 as far as the annular recess 9c in the upper cover 4. The lower cover 3 has, on the outside, an annular rim 13e, such as an annular flange, extending radially outward beyond the outer annular skirt 4c of the upper cover 4. The annular flange 13e prevents water splashes entering the interior of the suspension thrust bearing 1 by forming a labyrinth seal with the rim of the annular skirt 4c.

The flexible part 14 of the body 12 may be constituted of an elastomer, for example a synthetic rubber, such as polyurethane. This material is mounted on or moulded onto the lower cover 3. The flexible part 14 is moulded on by means of passages 12a left free in the rigid part 13 of the body 12, moulding the flexible material part 14 thus forming an axial stud 14a that extends from the lower surface 13b through the body 12 as far as the upper surface 3c of the latter. The axial stud 14a has at each of its ends annular portions 14b, 14c of parallelepiped general shape, for example, enabling retention in position of the flexible part 14 in the lower cover 3. The upper end 14c of the axial stud 14a comes to bear radially against the annular finger 13d and comprises two annular sealing lips 15, 16 inclined relative to each other, forming with the axis Y of the rolling bearing 2 an obtuse angle β and an acute angle α, respectively. The sealing lips 15, 16 thus extend outward in two different directions, forming a V-shaped section oriented perpendicularly to the axis Y. As shown, the sealing lips 15, 16 are situated on the same side of the bearing 2 and have a thickness less than the thickness of the axial stud 14a to preserve their maximum flexibility. Their thickness preferably decreases from their base, where they are joined together, to their free edge. In the example shown in FIGS. 1 and 2, the axial stud 14a is extended by a first sealing lip 15 cooperating with the cylindrical surface portion 4e of the outer annular skirt 4c of the upper cover 4 to leave a narrow passage $D_1$ forming a labyrinth seal between one edge of said labyrinth seal lip 15 and the upper cover 4. The narrow passage $D_1$ may be less than 1 mm wide and the narrow passage $D_1$ is advantageously of the order of 0.3 mm wide. The axial stud 14a is also extended by a second sealing lip 16 disposed on the path of any impurities coming from the outside between the rolling elements 7 and the labyrinth sealing lip 15 and axially above the labyrinth sealing lip 15. The sealing lip 16 forming a rubbing sealing lip is in rubbing contact with the radial surface portion 9b of the upper cover 4. The flexible material sealing lips 15, 16 are inclined relative to the axis orthogonal to the axis Y and integral with the upper annular portion 14c so that they are able to flex relative to said upper annular portion 14c.

As shown here, the sealing lips 15, 16 are disposed externally relative to the rolling elements 7 and the attachment means 4d, 3b such as hooks are disposed on the opposite side, i.e. on the inside relative to the rolling elements 7. Alternatively, the flexible part 14 could be disposed on the inside of the suspension thrust bearing 1, the labyrinth sealing lip 15 then forming a narrow passage with the inner axial skirt 4b of the upper cover 4 and the rubbing sealing lip 16 being in contact with the radial surface portion 9d of the upper cover 4. In this case, the attachment means 4d, 3b are situated on the opposite side, i.e. toward the outside of the suspension thrust bearing 1. The attachment means 4d, 3b and the sealing lips 15, 16 could equally be situated on the same side relative to the bearing 2. Of course, the sealing lips 15, 16 are in all cases separate from the attachment means 4d, 3b.

Figure 3:
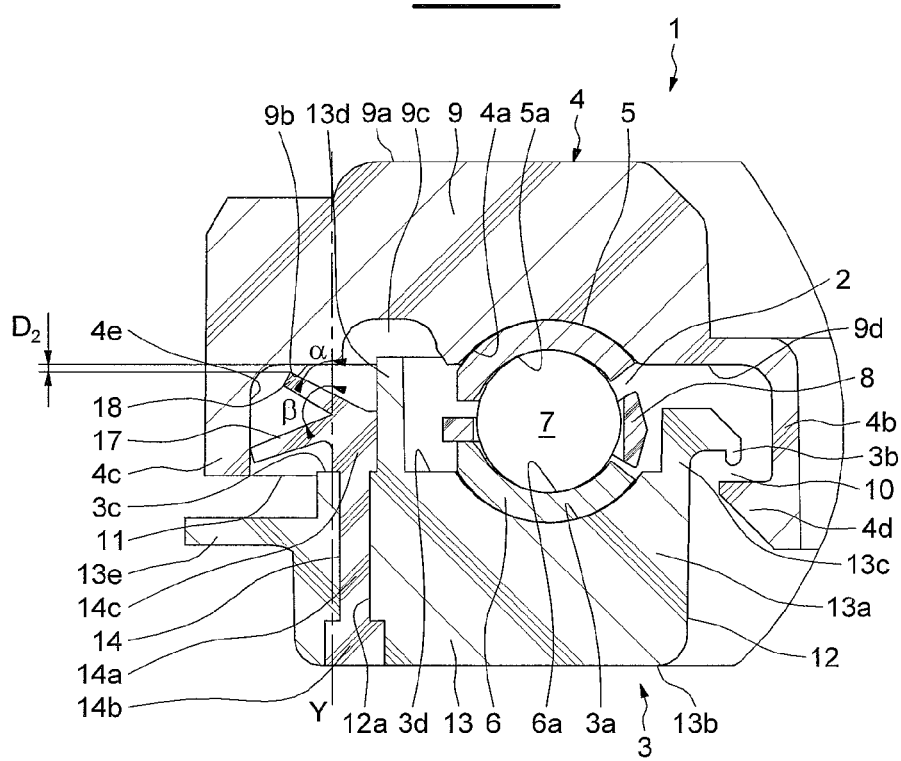
FIG. 3 is a view in section of a detail of a suspension thrust bearing device of a second embodiment of the invention.

FIG. 3 shows a second embodiment in which similar elements carry the same references and are not described further. In this embodiment, the structure of the lower cover 3 and the upper cover 4 is similar to the covers shown in FIGS. 1 and 2, only the flexible part 14 of the lower cover 3 being slightly different.

In the case of the lower cover 3, a body 12 comprises a rigid material part 13 onto which is moulded a flexible material part 14 situated on the outside relative to the bearing 2.

In this embodiment, the end 14c of the axial stud 14a comprises a rubbing seal first lip 17 projecting downward and in contact with a cylindrical surface portion 4e of the outer axial skirt 4c of the upper cover 4 and a labyrinth seal second lip 18 projecting upward and cooperating with the radial surface portion 9b of the upper cover 4 to leave a narrow passage $D_2$ between the edge of said labyrinth sealing lip 18 and the upper cover 4. The narrow passage $D_2$ is advantageously of the order of 1 mm wide.

The two sealing lips 17, 18 are inclined relative to each other, forming with the axis Y of the rolling bearing 2 an obtuse angle β and an acute angle α, respectively. The sealing lips 17, 18 thus extend outward in two different directions, forming a V-shaped section. As shown here, the sealing lips 17, 18 are situated on the same side relative to the bearing 2 and have a thickness less than the thickness of the axial stud 14a, to preserve their maximum flexibility. The labyrinth sealing lip 18 is disposed on the path of any impurities seeking to penetrate from the outside between the rolling elements 7 and the rubbing sealing lip 17 and axially above the rubbing sealing lip 17. The flexible material sealing lips 17, 18 are inclined relative to the axis orthogonal to the axis Y and integral with the upper annular portion 14c so that they are able to flex relative to said upper annular portion 14c.

The different embodiments that have just been described enable a suspension thrust bearing device to be produced that is sealed by at least two flexible sealing lips while axial retention of the upper cover relative to the lower cover is obtained via independent elements that are not part of the flexible part defining the sealing lips. By separating in this way the two technical functions, on the one hand the sealing function and on the other hand the axial retention function, it is possible to improve considerably the quality of sealing and axial retention. In fact, the relatively thin sealing lips and their inclination make it possible to guarantee that the suspension thrust bearing device is sealed without increasing the friction torque generated in the event of radial contact with the upper cover. For its part, efficacious axial retention may be achieved by attachment means of sufficiently rigid material, the thickness of which may be increased without affecting the sealing function assured by a labyrinth sealing lip and a rubbing sealing lip in contact with one of the covers.

The invention claimed is:

1. A suspension thrust bearing device comprising:
a lower cover,
an upper cover, the upper cover being formed only by rigid material, and
a rolling bearing disposed between the lower cover and the upper cover, and wherein
the rolling bearing comprises:
a lower ring mounted on the lower cover and
an upper ring mounted on the upper cover, and
rolling elements disposed between the two rings, and wherein
the lower cover having a body formed of a rigid material part and a flexible material part forming a seal of said device, and
attachment means being provided on each of the lower cover and the upper cover to prevent axial separation of said covers, and wherein
the flexible part of the body of said lower cover includes at least one labyrinth sealing lip not in contact with any rigid surface while cooperating with the upper cover to leave a narrow passage forming a labyrinth seal between one edge of said labyrinth sealing lip and the upper cover and at least one rubbing sealing lip in continuous contact with the upper cover and wherein the sealing lips are separate from the attachment means.

2. The suspension thrust bearing device according to claim 1, wherein the sealing lips are disposed on a same side relative to the rolling bearing.

3. The suspension thrust bearing device according to claim 1, wherein the rubbing sealing lip is disposed between the rolling elements and the labyrinth sealing lip.

4. The suspension thrust bearing device according to claim 3, wherein the rubbing sealing lip is in contact with a radial surface portion of the upper cover.

5. The suspension thrust bearing device according to claim 1, wherein the labyrinth sealing lip is disposed between the rolling elements and the rubbing sealing lip.

6. The suspension thrust bearing device according to claim 5, wherein the rubbing sealing lip is in contact with a cylindrical surface portion of the upper cover.

7. The suspension thrust bearing device according to claim 1, wherein the sealing lips are inclined relative to each other, forming with an axis (Y) of the rolling bearing an obtuse angle ($\beta$) and an acute angle ($\alpha$), respectively.

8. The suspension thrust bearing device according to claim 1, wherein the lower cover comprises a radial annular flange extending radially outward beyond the upper cover.

9. The suspension thrust bearing device according to claim 1, wherein the upper cover comprises an inner annular skirt and an outer annular skirt, and wherein the inner annular skirt comprises a hook extending radially toward the lower cover and able to cooperate with a corresponding hook on the lower cover.

10. The suspension thrust bearing device according to claim 9 wherein the hooks are disposed on an opposite side of the rolling elements to the sealing lips.

11. The suspension thrust bearing device according to claim 9, wherein the hooks are disposed on an inside of the rolling elements and the sealing lips are disposed on the outside of the rolling elements.

12. The suspension thrust bearing device according to claim 1, wherein the rigid material part and the flexible material part of said body are formed from synthetic materials of different kinds and are moulded one onto the other.

13. A strut comprising:
a damper, and
a suspension thrust bearing device, the thrust bearing device comprising:
a lower cover,
an upper cover, the upper cover being formed only by rigid material, and
a rolling bearing disposed between the lower cover and the upper cover, and wherein
the rolling bearing comprises:
a lower ring mounted on the lower cover and
an upper ring mounted on the upper cover, and
rolling elements disposed between the two rings, and wherein
the lower cover having a body formed of a rigid material part and a flexible material part forming a seal of said device, and
attachment means being provided on each of the lower cover and the upper cover to prevent axial separation of said covers, and wherein
the flexible part of the body of said lower cover includes at least one labyrinth sealing lip not in contact with any rigid surface while cooperating with the upper cover to leave a narrow passage forming a labyrinth seal between one edge of said labyrinth sealing lip and the upper cover and at least one rubbing sealing lip in continuous contact with the upper cover and wherein
the sealing lips are separate from the attachment means.

14. A suspension thrust bearing device comprising:
a lower cover,
an upper cover, the upper cover being formed only by rigid material, and
a rolling bearing disposed between the lower cover and the upper cover, and wherein
the rolling bearing comprises:
a lower ring mounted on the lower cover and
an upper ring mounted on the upper cover, and
rolling elements disposed between the two rings, and wherein
the lower cover having a body formed of a rigid material part and a flexible material part forming a seal of said device, and
attachment means being provided on each of the lower cover and the upper cover to prevent axial separation of said covers, and wherein
the flexible part of the body of said lower cover being formed by a single member, the flexible part comprises at least one labyrinth sealing lip not in contact with any rigid surface while cooperating with the upper cover to leave a narrow passage forming a labyrinth seal between one edge of said labyrinth sealing lip and the upper cover and at least one rubbing sealing lip in continuous contact with the upper cover, the at least one labyrinth sealing lip and the at least one rubbing sealing lip extending from a common point; and
wherein the sealing lips are separate from the attachment means.

* * * * *